(12) United States Patent
Dorsey

(10) Patent No.: US 6,267,425 B1
(45) Date of Patent: Jul. 31, 2001

(54) FISHING ROD CARRIER

(76) Inventor: Richard J. Dorsey, 302 8th Ave. SW., Largo, FL (US) 33770

( * ) Notice: Subject to any disclaimer, the term of this patent is extended or adjusted under 35 U.S.C. 154(b) by 0 days.

(21) Appl. No.: 09/664,685

(22) Filed: Sep. 19, 2000

(51) Int. Cl.[7] .............................. A01K 97/10; B65D 71/00
(52) U.S. Cl. ..................... 294/143; 43/21.2; 211/70.8; 224/922; 294/159
(58) Field of Search ........................ 294/143, 146, 294/147, 159, 161–163, 165; 43/21.2, 26, 54.1; 206/315.1, 315.2, 315.11, 443; 211/70.2, 70.8; 224/249, 913, 917, 917.5, 922

(56) References Cited

U.S. PATENT DOCUMENTS

| | | | |
|---|---|---|---|
| 2,854,147 | * | 9/1958 | Derr ........................................ 211/70.8 |
| 4,014,466 | * | 3/1977 | Wess et al. ............................ 294/162 |
| 4,696,122 | * | 9/1987 | Van Der Zyl ..................... 294/159 X |
| 5,137,319 | * | 8/1992 | Sauder ................................... 294/159 |
| 5,450,688 | * | 9/1995 | Hall .................................. 224/922 X |
| 5,803,519 | * | 9/1998 | Daigle .................................. 294/159 |
| 6,047,491 | * | 4/2000 | De Busk .......................... 224/922 X |

* cited by examiner

Primary Examiner—Johnny D. Cherry
(74) Attorney, Agent, or Firm—Harold D. Shall

(57) ABSTRACT

A rod carrier including a body portion with plates secured to its opposed end. The plates have openings wherein rods can be disposed and secured. A handle on the body portion is receivable in a mounting member and releaseably secured thereto. The mounting member is securable to a supporting surface.

5 Claims, 2 Drawing Sheets

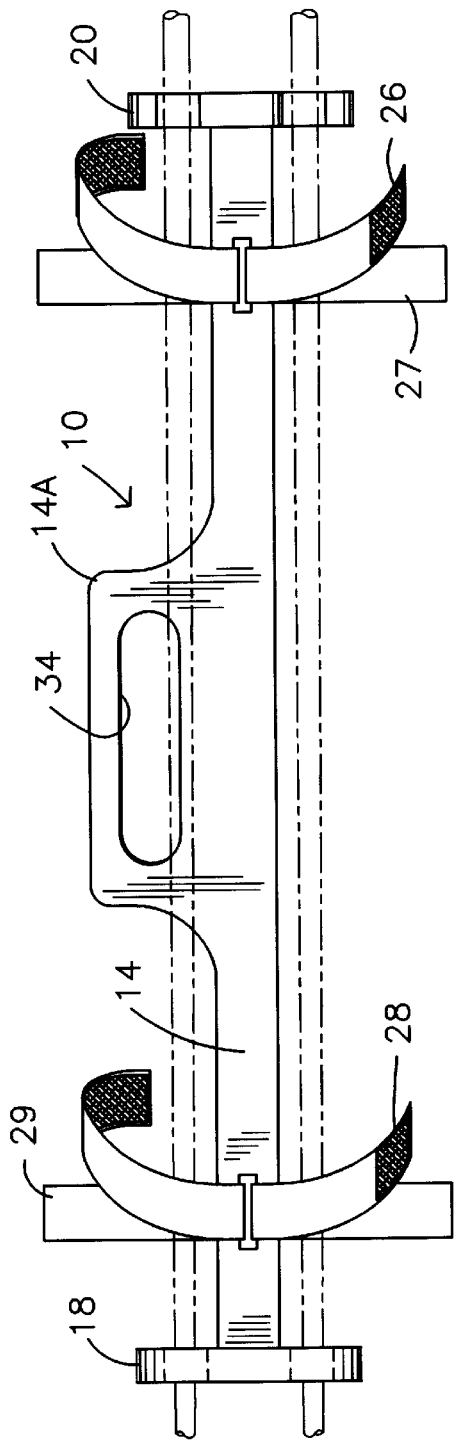
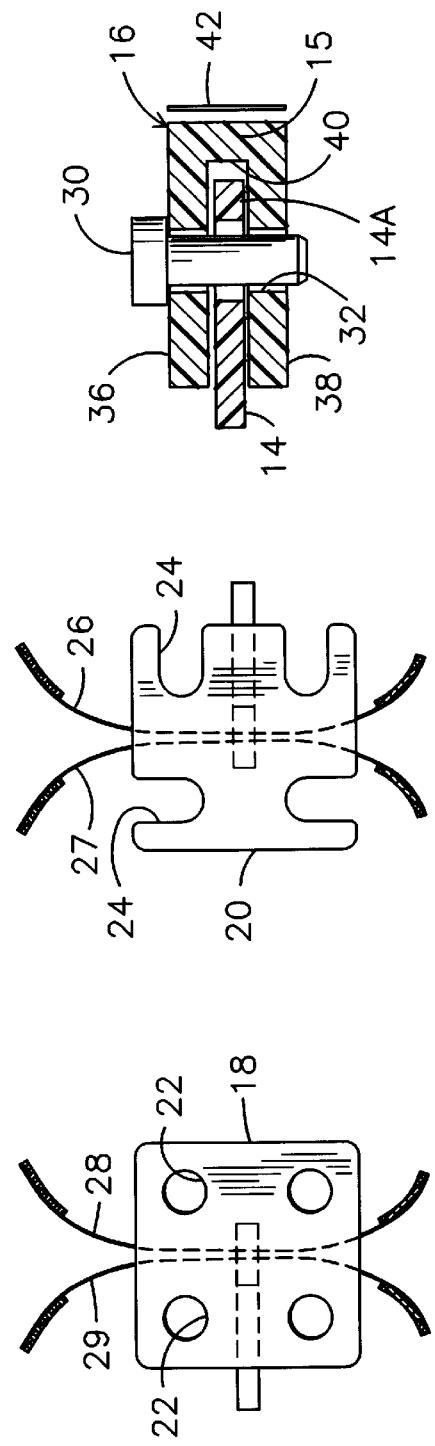

FISHING ROD CARRIER

BACKGROUND OF THE INVENTION

1) Field of the Invention

This invention relates to carriers for rod shaped members such as fishing rods and more particularly to such a carrier having provisions for grasping and carrying the same and also including an arrangement for securing the same to a surface for storage purposes.

2) Description of the Prior Art

Rod carrying devices are well known in the art. These encompass devices such as shown in U.S. Pat. No. 6,047,491, which includes a pair of spaced end members 18 and 20 with aligned openings therein for receiving a plurality of fishing rods, and also having a handle 28 for grasping and thereby carrying the device to transport the rods therein. A bottom 12 carries the end members 18 and 20 and supports the carrier on the floor for storage purposes.

This device has short comings in that, when stored on the floor, the device is still in the way and can be stepped upon. Also, when on a boat, the rods stored on the deck of the boat take up a great deal of deck space and are certainly exposed to being stepped upon by an occupant, particularly in rough weather when the occupant may be thrown about and/or the rod holder moved about the deck.

It is an object of this invention to provide a rod carrier for securely and safely carrying rods that includes means for securing the same for safe and out of the way storage. Another object is to provide such a device wherein more than one securing means can be used with the carrying portion so that the latter portion can be secured in a plurality of locations, such as on a vessel, in a truck, and in the users home.

SUMMARY OF THE INVENTION

The present invention includes a pair of spaced end members interconnected by an elongated portion, with the latter having a graspable handle intermediate the ends thereof. The end members each have a plurality of circumferentially spaced, axially extending openings therein, with each opening in one end member being axially aligned with an opening in the other end member to provide pairs of aligned openings. One opening of each pair of openings is elongated and extends to the periphery of the member it is in, so that it is actually a slot. To place a pole in a pair of openings, it is easy to insert one end of the pole, such as the handle, into the plain opening and then place the opposed end of the rod into the aligned slotted opening. Releasable securing means are provided to hold the rods in the slots. The graspable handle is axially elongated and dimensioned to fit into a slot in a mounting member, and the latter is proved with surface securing means to secure the back face thereof to a rigid surface, such as, a wall, the hull of a boat, the wall, ceiling or floor of a vehicle, or the like, which securing means can be, for example, two sided adhesive mounting tape or hook and loop tape. A cross pin is then place through aligned laterally extending openings in the mounting member which are in registration with the opening in the handle to secure the handle in the mounting means. The cross pin can be easily removed to allow an individual to grasp the handle and then transport the holder with the rods therein.

BRIEF DESCRIPTION OF THE DRAWINGS

FIG. 2 is a top plan view of the device of FIG. 1 with the mounting member omitted;

FIG. 3 is a left end elevational view of the device of FIG. 1;

FIG. 4 is a right end elevational view of the device of FIG. 1; and

FIG. 5 is a cross sectional view taken along the lines 5—5 in FIG. 1.

DETAILED DESCRIPTION OF THE PREFERRED EMBODIMENT

Figure 1:
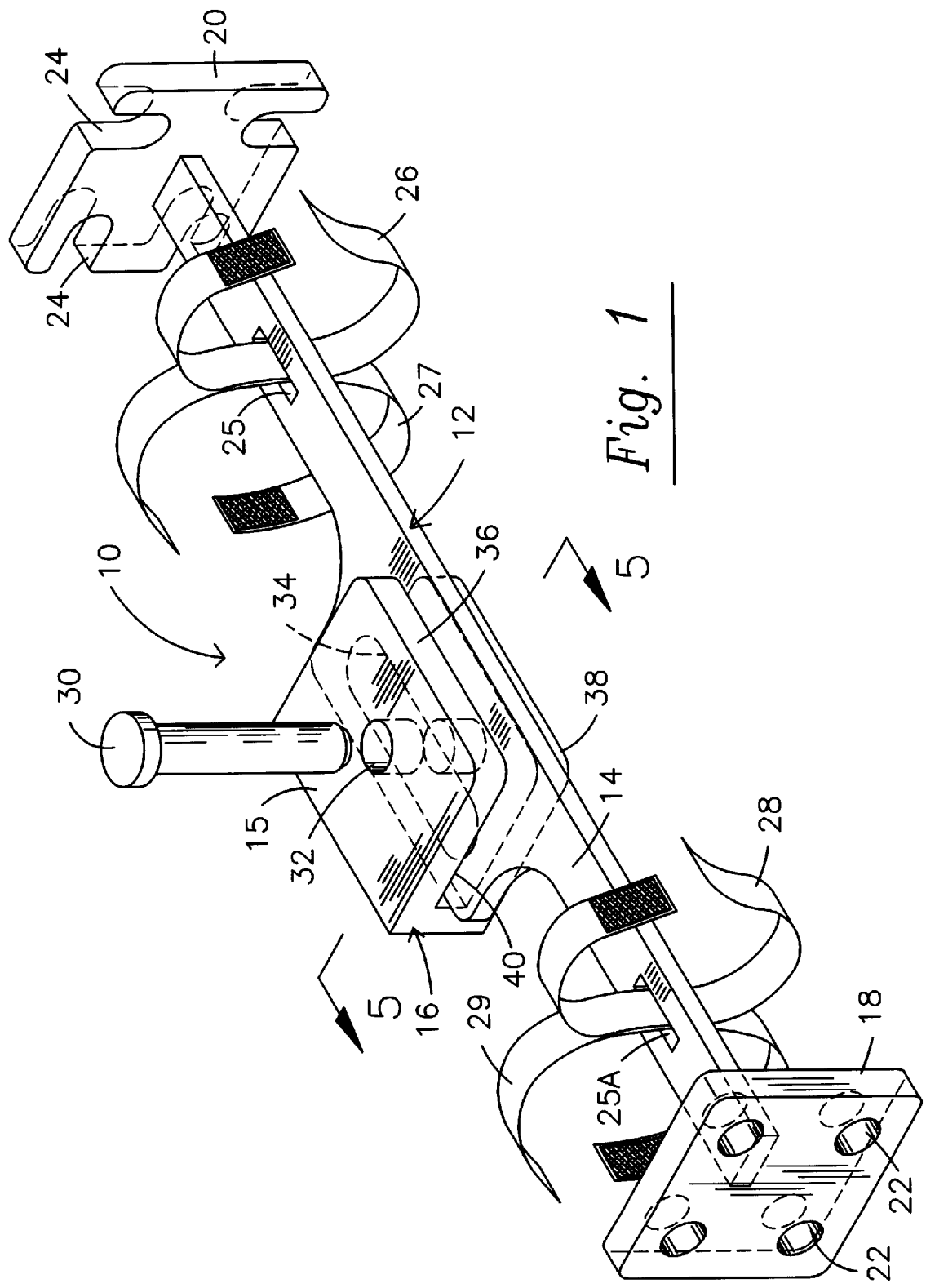
FIG. 1 is a perspective view of the invention with the cross pin out of but aligned with the opening in the mounting member.

Referring now to the drawings, a rod holder is shown generally at 12 and includes an axially elongated handle bearing body portion 14 and a mounting member 16. The portion 14 has a handgrip portion 14A projecting from the main body thereof, which handgrip portion has a finger receiving opening 34 therein. On the axially opposed ends of the body portion 14 are an end plate member 18, on the left end and an end plate 20 on the right end, with the end plate 18 having a plurality (four as shown) of axially extending and circumferentially spaced openings 22 therethrough and the end plate 20 having a like plurality of axially extending and circumferentially spaced openings in the form of slots 24 therethrough, with each opening 22 being in axially alignment with a cooperating slot 24. As shown in phantom lines in FIG. 2, poles can be received in and rest in each pair of aligned openings, Adjacent the left end plate 18, the body portion 14 has a transverse slot 25A therethrough in which is received a pair of releasable securing members in the form of hook and loop strips 28 and 29, and adjacent the right end plate 20, the body portion 14 has a transverse slot 25 therethrough in which is received a pair of releasable securing members in the form of hook and loop strips 26 and 27. The opposed ends of the strip 26 and the opposed ends of the strip 28 can be conventionally joined to releasably secure poles in the openings 22 and 24 as can the opposed ends of the strips 27 and 29 be joined to secure poles in aligned openings 22 and 24.

The mounting member 16 includes a base portion 15 from which project a pair of spaced flanges 36 and 38, having a slot 40 therebetween, and, as seen in FIGS. 1 and 5, the handgrip portion 14A is received in the slot 40 with the flanges 36 and 38 overlying the handgrip portion 14A and the adjoining area of the body portion 14. The mounting member 16 has an opening 32 extending laterally through the flanges 36 and 38 and a headed locking pin 30 is receivable in the opening 32 to lock the body portion 14 in the mounting member 16. Securing means 42, such as two sided adhesive mounting tape is secured to the bottom (the back) of the base 15 of the mounting member 16, so that the latter can be secured to a desired supporting surface, such as, but not limited to, the wall of a garage, the hull of a boat, and the side or roof of a vehicle (either inside or outside). It is contemplated that an owner will have several mounting members so that the body portion, with the poles therein, can be released from storage in his house taken to and secured in his truck for safe transport to his boat, removed from the truck then carried to and secured to a mounting member in his boat where one or more of the poles can be released and ready for use.

While only a single embodiment of this invention has been shown and described, it is apparent that many changes can be made therein without departing from the scope of this invention as defined by the following claims:

What is claimed is:

1. A rod carrier comprising in combination,
   a) an axially elongated body portion, having a hand grip portion including a hand receiving opening, formed intermediate the axially opposed ends thereof,
   b) a first and a second end plate extending transversely of said body portion with one of said plates being secured on one axial end of said body portion and the other end plate being secured on the opposite axial end of said body portion,
   c) said end plates having portions thereof projecting transversely beyond said body portion and one of said end plates having a plurality of circumferentially spaced axially extending openings therein and the other of said end plates having a plurality of slotted openings therein open to the periphery thereof with one of said slotted openings being in axial alignment with each of said openings in said one end plate,
   d) releasable securing means carried by said carrier for securing rods in said openings, and
   e) mounting means having a portion thereof adapted to be secured to a supporting surface and having receiving means therein for releaseably lockingly receiving said hand grip portion of said body portion.

2. A rod carrier according to claim 1 wherein said mounting means has a back face and a receiving face opposed thereto, said back face has a securing member attached thereto and said receiving face has a slot therein.

3. A carrier according to claim 2 wherein said securing member is two-faced mounting tape.

4. A carrier according to claim 2 wherein said hand grip portion fits into said slot and said mounting means has a pin receiving opening therein and a pin received in said pin receiving opening is fit into said hand receiving opening to lock said body portion to said mounting member.

5. A carrier according to claim 4 wherein said securing member is two-faced mounting tape.

* * * * *